United States Patent
Wells et al.

(10) Patent No.: US 10,974,144 B2
(45) Date of Patent: Apr. 13, 2021

(54) METHODS FOR EMULATING A VIRTUAL CONTROLLER DEVICE, EMULATORS, AND COMPUTER-READABLE MEDIA

(71) Applicant: RAZER (ASIA-PACIFIC) PTE. LTD., Singapore (SG)

(72) Inventors: Stuart Wells, San Francisco, CA (US); Anthony P. Casano, Felton, CA (US)

(73) Assignee: RAZER (ASIA-PACIFIC) PTE. LTD.

( * ) Notice: Subject to any disclaimer, the term of this patent is extended or adjusted under 35 U.S.C. 154(b) by 65 days.

(21) Appl. No.: 16/329,452

(22) PCT Filed: Sep. 1, 2016

(86) PCT No.: PCT/SG2016/050427
§ 371 (c)(1),
(2) Date: Feb. 28, 2019

(87) PCT Pub. No.: WO2018/044229
PCT Pub. Date: Mar. 8, 2018

(65) Prior Publication Data
US 2019/0217193 A1    Jul. 18, 2019

(51) Int. Cl.
*A63F 13/42*  (2014.01)
*G06F 9/455*  (2018.01)
(Continued)

(52) U.S. Cl.
CPC ............ *A63F 13/42* (2014.09); *A63F 13/211* (2014.09); *A63F 13/22* (2014.09); *A63F 13/23* (2014.09);
(Continued)

(58) Field of Classification Search
CPC ...... A63F 13/23; A63F 13/211; A63F 13/214; A63F 13/22; A63F 13/42; A63F 13/40
See application file for complete search history.

(56) References Cited

U.S. PATENT DOCUMENTS

| 5,421,590 A | 6/1995 | Robbins |
| 6,811,491 B1 | 11/2004 | Levenberg et al. |

(Continued)

FOREIGN PATENT DOCUMENTS

| GB | 2 357 347 A | 6/2001 |
| WO | WO 2006/100540 A1 | 9/2006 |
| WO | WO 2016/080906 A1 | 5/2016 |

OTHER PUBLICATIONS

Extended European Search Report dated Jul. 23, 2019, 10 pages, for the corresponding European Patent Application No. 16915338.4.
(Continued)

*Primary Examiner* — Steve Rowland
(74) *Attorney, Agent, or Firm* — Polsinelli PC

(57) ABSTRACT

According to various embodiments, a method for emulating a virtual controller device may be provided. The method may include: receiving input from a game controller; determining whether the received input is assigned to a first virtual controller device or to a second virtual controller device; outputting data related to the first virtual controller device if it is determined that the received input is assigned to the first virtual controller device; and outputting data related to the second virtual controller device if it is determined that the received input is assigned to the second virtual controller device.

18 Claims, 8 Drawing Sheets

(51) Int. Cl.
  *A63F 13/22*  (2014.01)
  *A63F 13/40*  (2014.01)
  *G06F 9/4401* (2018.01)
  *A63F 13/211* (2014.01)
  *A63F 13/23*  (2014.01)
  *A63F 13/214* (2014.01)

(52) U.S. Cl.
  CPC ............ *A63F 13/40* (2014.09); *G06F 9/4411* (2013.01); *G06F 9/455* (2013.01); *A63F 13/214* (2014.09); *A63F 2300/105* (2013.01); *A63F 2300/1018* (2013.01); *A63F 2300/1025* (2013.01); *A63F 2300/1068* (2013.01); *A63F 2300/8082* (2013.01)

(56) References Cited

U.S. PATENT DOCUMENTS

| | | | |
|---|---|---|---|
| 7,379,778 | B2 | 5/2008 | Hayes et al. |
| 7,803,054 | B1 | 9/2010 | Ogus et al. |
| 8,147,330 | B2 | 4/2012 | Matsuda et al. |
| 8,298,084 | B2 | 10/2012 | Yee |
| 8,469,811 | B2 | 6/2013 | Watanabe |
| 8,795,078 | B1 * | 8/2014 | Musick, Jr. ............. A63F 13/10 463/37 |
| 10,318,013 | B1 * | 6/2019 | Banks ................... G06F 3/0655 |
| 2004/0178576 | A1 * | 9/2004 | Hillis ..................... A63F 13/06 273/148 B |
| 2006/0097453 | A1 * | 5/2006 | Feldman ............... A63F 13/218 273/304 |
| 2007/0061126 | A1 | 3/2007 | Russo et al. |
| 2007/0213128 | A1 | 9/2007 | Ohta |
| 2008/0288878 | A1 | 11/2008 | Hayashi et al. |
| 2009/0318223 | A1 | 12/2009 | Langridge et al. |
| 2011/0009195 | A1 | 1/2011 | Porwal |
| 2011/0312417 | A1 * | 12/2011 | MacKay ................. A63F 13/23 463/38 |
| 2013/0283213 | A1 * | 10/2013 | Guendelman ....... G06F 3/04842 715/848 |
| 2013/0324236 | A1 * | 12/2013 | Koppe ................... A63F 13/06 463/29 |
| 2014/0094299 | A1 | 4/2014 | Stine et al. |
| 2014/0094313 | A1 | 4/2014 | Watson et al. |
| 2014/0274380 | A1 | 9/2014 | Kazama |
| 2014/0331138 | A1 * | 11/2014 | Overton ................. A63F 13/31 715/720 |
| 2015/0134313 | A1 | 5/2015 | Maturana et al. |
| 2015/0209666 | A1 | 7/2015 | Harris et al. |
| 2016/0357249 | A1 * | 12/2016 | Webb ..................... G06F 3/017 |
| 2016/0361638 | A1 * | 12/2016 | Higgins ................. A63F 13/24 |
| 2017/0249019 | A1 * | 8/2017 | Sawyer ............. G02B 27/0179 |
| 2017/0346792 | A1 * | 11/2017 | Nataros .................. G06F 13/28 |

OTHER PUBLICATIONS

International Search Report and Written Opinion, dated May 30, 2017, for the corresponding International Application No. PCT/SG2016/050427 in 9 pages.

* cited by examiner

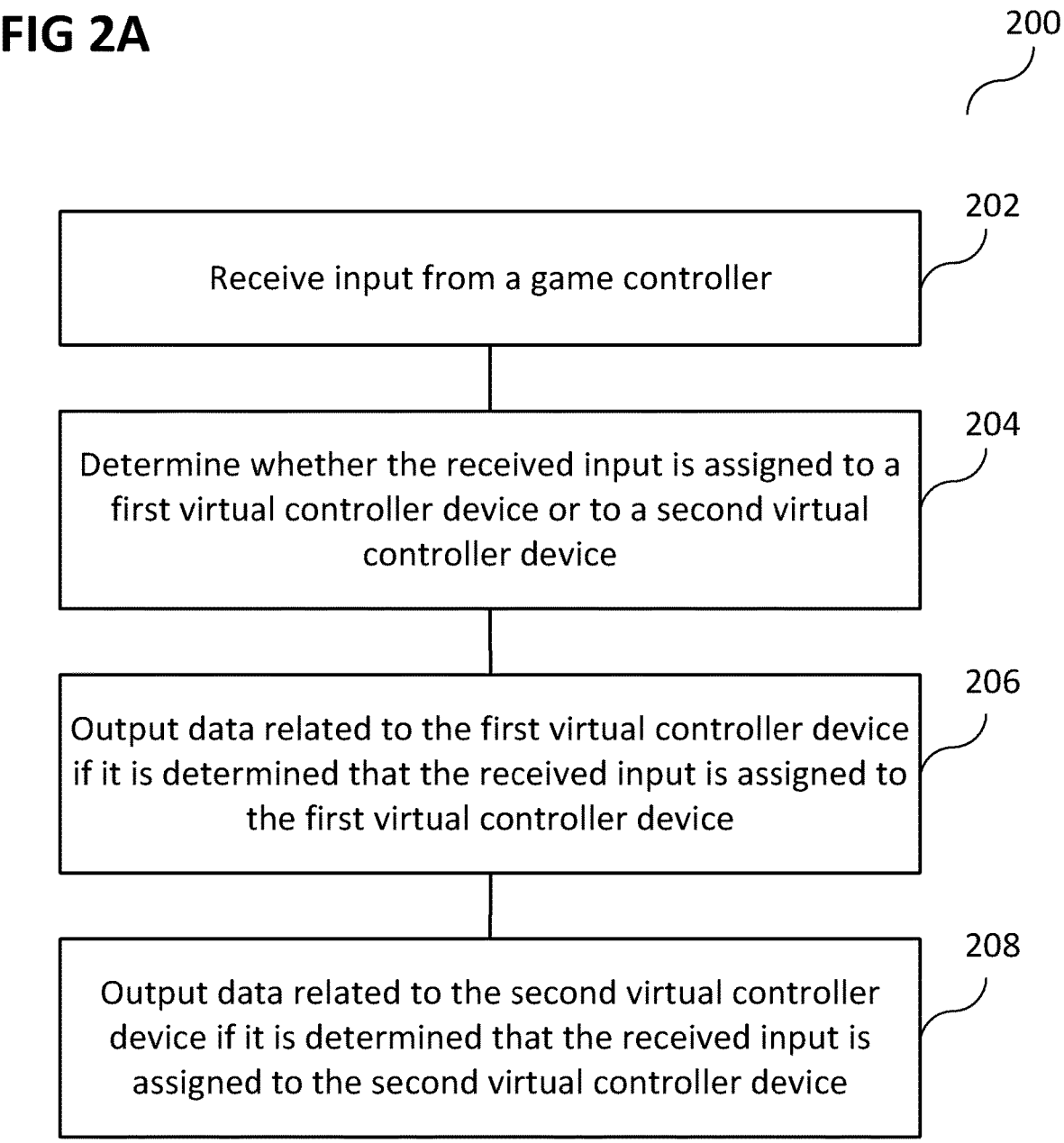

US 10,974,144 B2

METHODS FOR EMULATING A VIRTUAL CONTROLLER DEVICE, EMULATORS, AND COMPUTER-READABLE MEDIA

TECHNICAL FIELD

Various embodiments generally relate to methods for emulating a virtual controller device, emulators, and computer-readable media.

BACKGROUND

Commonly used gamepad controllers may have enough inputs that they could represent one or more virtual game controllers. However, virtual reality applications may not work with existing gamepad controllers.

SUMMARY OF THE INVENTION

According to various embodiments, a method for emulating a virtual controller device may be provided. The method may include: receiving input from a game controller; determining whether the received input is assigned to a first virtual controller device or to a second virtual controller device; outputting data related to the first virtual controller device if it is determined that the received input is assigned to the first virtual controller device; and outputting data related to the second virtual controller device if it is determined that the received input is assigned to the second virtual controller device.

According to various embodiments, an emulator may be provided. The emulator may include: a receiver configured to receive input from a game controller; a determination circuit configured to determine whether the received input is assigned to a first virtual controller device or to a second virtual controller device; and an output circuit configured to output data related to the first virtual controller device if it is determined that the received input is assigned to the first virtual controller device, and configured to output data related to the second virtual controller device if it is determined that the received input is assigned to the second virtual controller device.

According to various embodiments, a computer-readable medium may be provided. The computer-readable medium may include instructions which, when executed by a computer, make the computer perform a method for emulating a virtual controller device. The method may include: receiving input from a game controller; determining whether the received input is assigned to a first virtual controller device or to a second virtual controller device; outputting data related to the first virtual controller device if it is determined that the received input is assigned to the first virtual controller device; and outputting data related to the second virtual controller device if it is determined that the received input is assigned to the second virtual controller device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 2A shows a flow diagram illustrating a method for emulating a virtual controller device according to various embodiments.

DETAILED DESCRIPTION

Figure 1A:
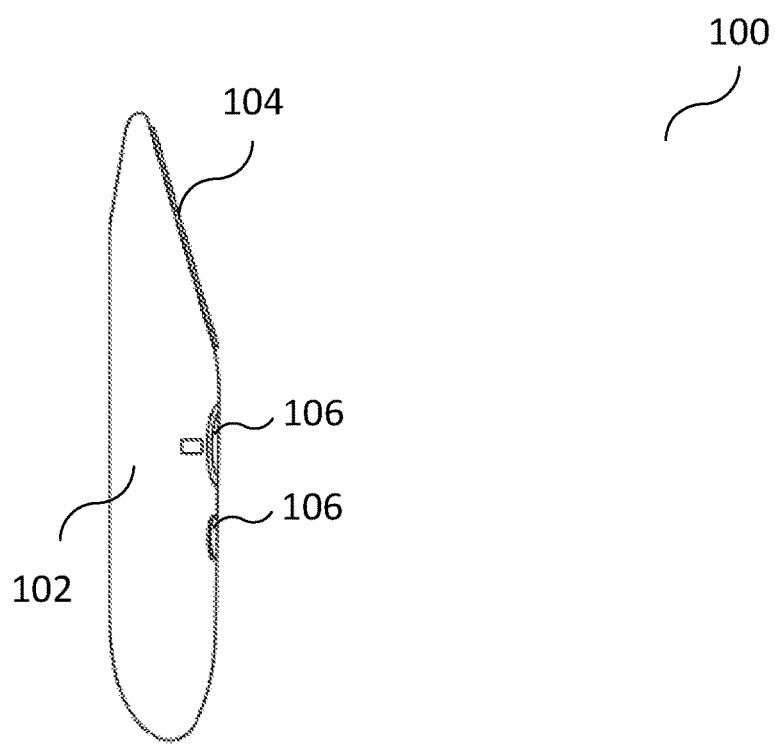
FIG. 1A shows a side view of an Oculus Rift Controller.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the emulator as described in this description may include a memory which is for example used in the processing carried out in the emulator. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

Virtual reality controllers may be provided, for example an Oculus Rift Controller, a Google Daydream Controller, a TERIOS T-1 Bluetooth remote controller VR gamepad.

FIG. 1A shows a side view 100 of an Oculus Rift Controller 102.

Figure 1B:
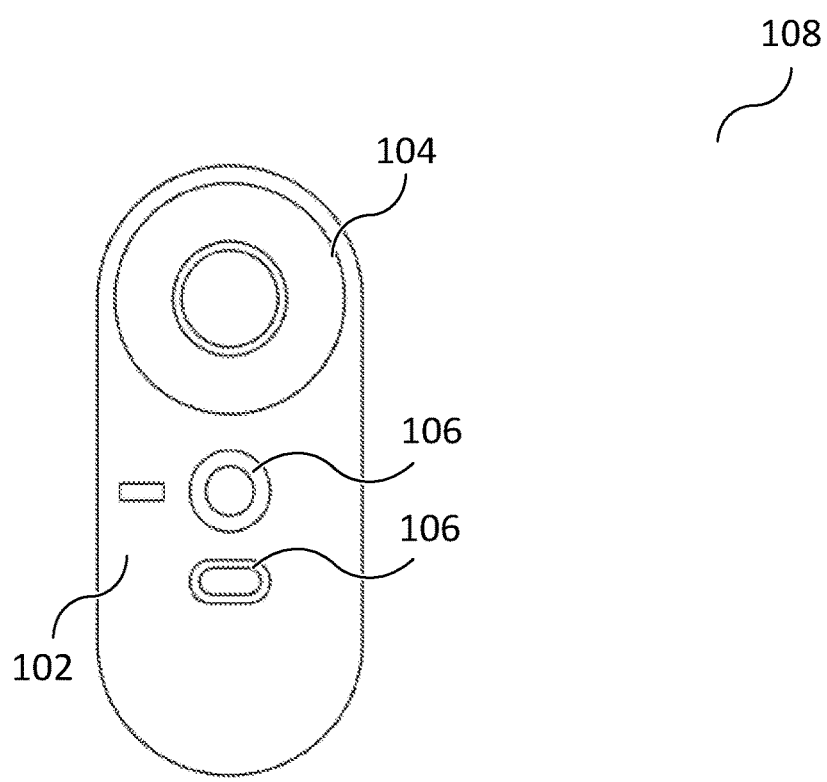
FIG. 1B shows a top view of the Oculus Rift Controller.

FIG. 1B shows a top view 108 of the Oculus Rift Controller 102.

Figure 1C:
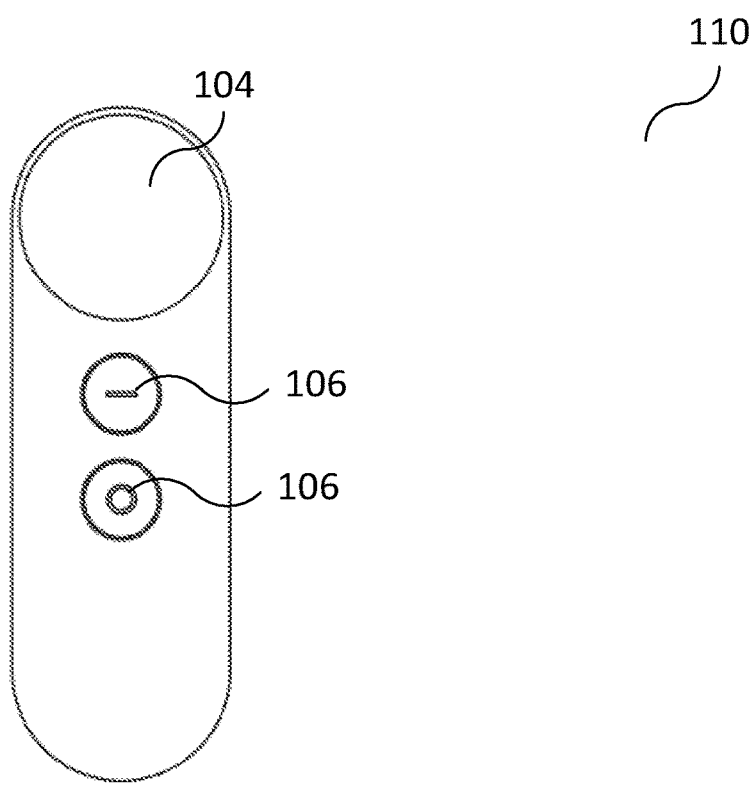
FIG. 1C shows a Google Daydream Controller.

FIG. 1C shows a Google Daydream Controller 110.

Figure 1D:
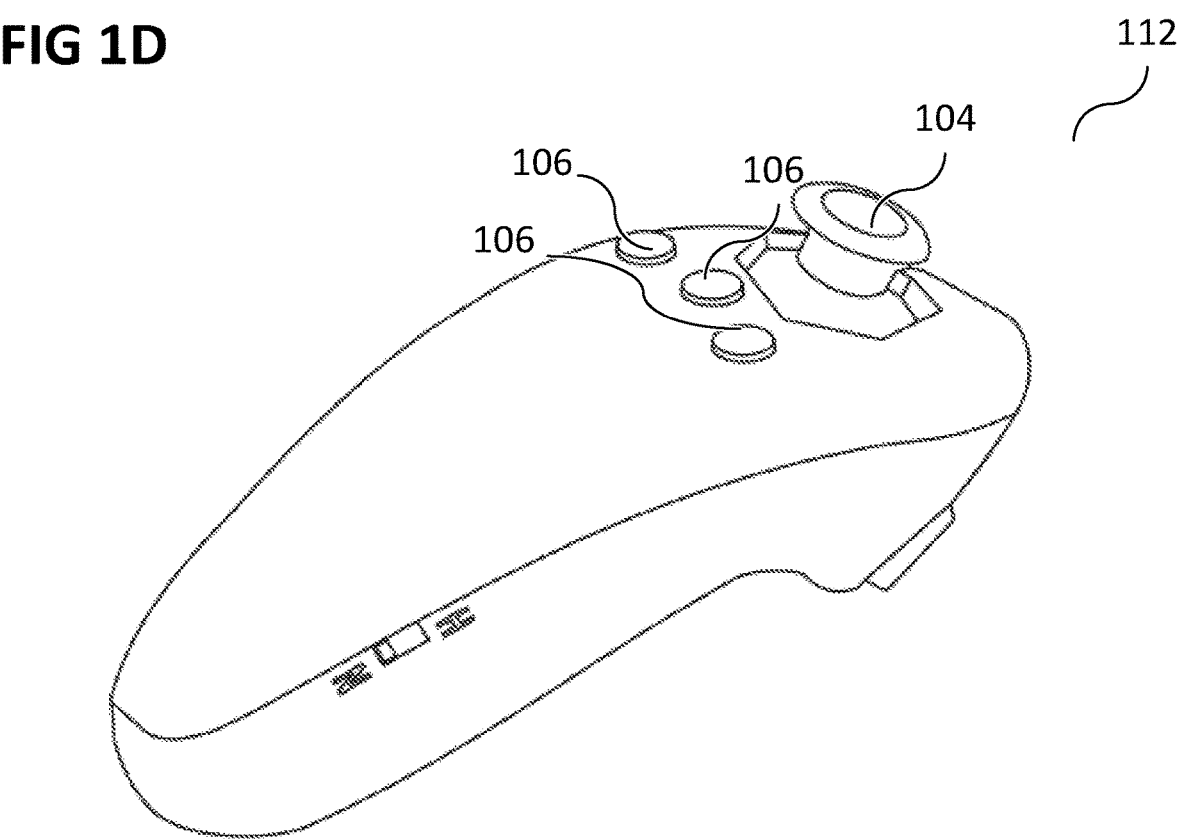
FIG. 1D shows a TERIOS T-1 Bluetooth remote controller VR gamepad.

FIG. 1D shows a TERIOS T-1 Bluetooth remote controller VR gamepad 112.

The controllers shown in FIG. 1A to FIG. 1D each may have a combination of buttons 106 and axis inputs 104. The top area of each of those controllers may either be the axis input 104 or designed using touch pads, which represent a hash input function. For example, two to four buttons 106 may be provided on the controllers.

Figure 1E:
FIG. 1E shows a PlayStation 4 controller.

FIG. 1E shows a PlayStation 4 controller 114 as an example of a commonly used game controller (for example gamepad controller).

Commonly used gamepad controllers may have enough inputs that they could represent one or more virtual game controllers. However, (virtual reality) applications may not work with existing gamepad controllers.

According to various embodiments, a device driver may be provided that represents one or multiple virtual VR controllers, so the applications make use of existing hardware.

According to various embodiments, a device driver or user space applications may be provided which take input from a standard game controller and represent one virtual reality controller or a plurality of virtual reality controllers (for example two different virtual reality controllers).

According to various embodiments, a single game controller representing one virtual reality controller or multiple virtual reality controllers may be provided.

FIG. 2A shows a flow diagram 200 illustrating a method for emulating a virtual controller device according to various embodiments. In 202, input from a game controller may be received. In 204, it may be determined whether the received input is assigned to a first virtual controller device or to a second virtual controller device. In 206, data related to the first virtual controller device may be output if it is determined that the received input is assigned to the first virtual controller device. In 208, data related to the second virtual controller device may be output if it is determined that the received input is assigned to the second virtual controller device.

In other words, input to a physical device may be received, and based on the input, the input may either be emulated to be input related to a first virtual device or be emulated to be input related to a second virtual device (or input related to both the first virtual device and the second virtual device).

According to various embodiments, the first virtual controller device and/or the second virtual controller device may include or may be or may be included in a controller of a type which is different from a type of the game controller.

According to various embodiments, the first virtual controller device may include a hardware button of a virtual reality controller. According to various embodiments, the second virtual controller device may include an accelerometer of the virtual reality controller According to various embodiments, the method may further include receiving user input for assignment of the received input to the first virtual controller device or to the second virtual controller device.

According to various embodiments, the game controller may include a plurality of input elements, and each input element of the plurality of input element may be assigned to the first virtual controller device or to the second virtual controller device.

According to various embodiments, the game controller may include a plurality of input elements, and a combination of input elements of the plurality of input element is assigned to the first virtual controller device or to the second virtual controller device.

According to various embodiments, the input may be received from the game controller using a hardware interface to a computer.

According to various embodiments, the hardware interface may include or may be at least one of universal serial bus or Bluetooth.

According to various embodiments, data related to the first virtual controller device may be output to a driver interface if it is determined that the received input is assigned to the first virtual controller device; and data related to the second virtual controller device may be output to a driver interface if it is determined that the received input is assigned to the second virtual controller device.

According to various embodiments, data related to the first virtual controller device may be output to a kernel of an operating system if it is determined that the received input is assigned to the first virtual controller device; and data related to the second virtual controller device may be output to a kernel of an operating system if it is determined that the received input is assigned to the second virtual controller device.

According to various embodiments, data related to the first virtual controller device may be output to a user space application if it is determined that the received input is assigned to the first virtual controller device; and data related to the second virtual controller device may be output to a user space application if it is determined that the received input is assigned to the second virtual controller device.

Figure 2B:
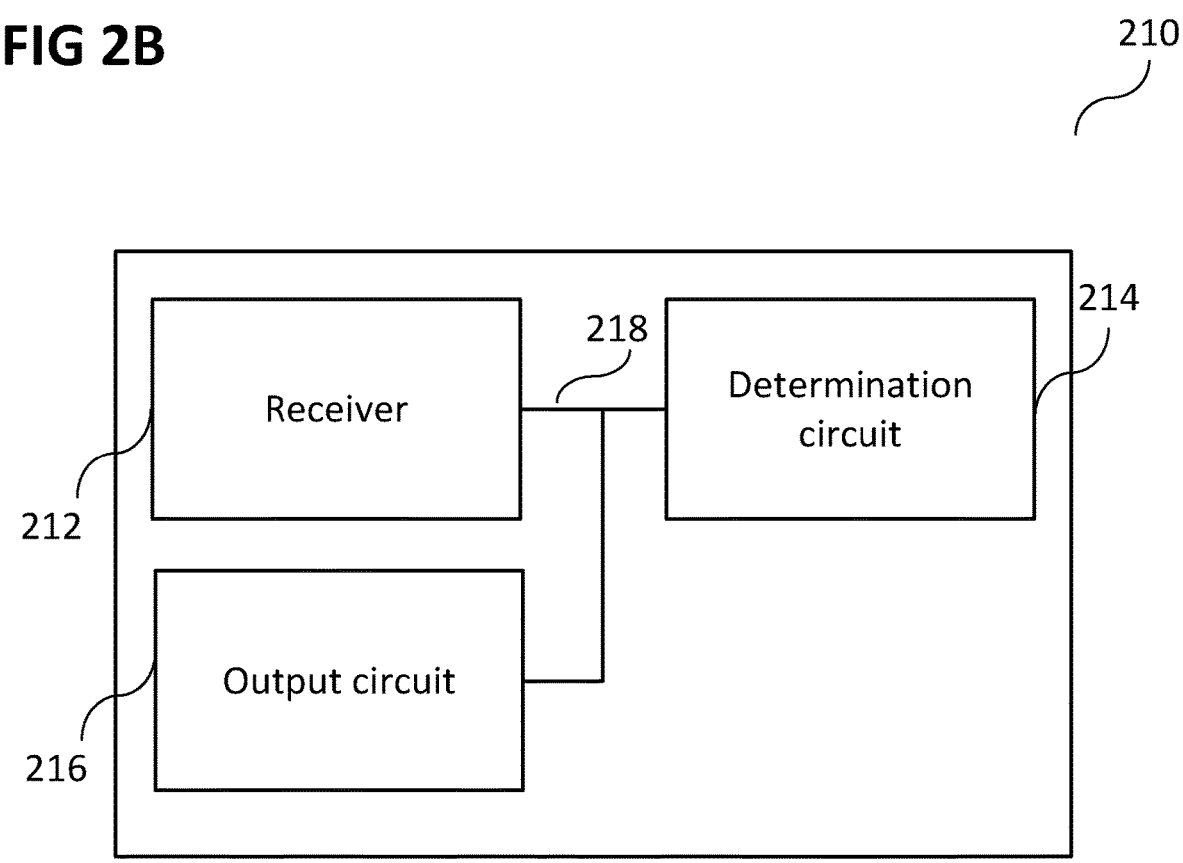
FIG. 2B shows an emulator according to various embodiments.

FIG. 2B shows an emulator 210 according to various embodiments. The emulator 210 may include a receiver 212 configured to receive input from a game controller. The emulator 210 may further include a determination circuit 214 configured to determine whether the received input is assigned to a first virtual controller device or to a second virtual controller device. The emulator 210 may further include an output circuit 216 configured to output data related to the first virtual controller device if it is determined that the received input is assigned to the first virtual controller device, and configured to output data related to the second virtual controller device if it is determined that the received input is assigned to the second virtual controller device. The receiver 212, the determination circuit 214, and the output circuit 216 may be coupled with each other, like indicated by lines 218, for example electrically coupled, for example using a line or a cable, and/or mechanically coupled.

According to various embodiments, the first virtual controller device and/or the second virtual controller device may include or may be or may be included in a controller of a type which is different from a type of the game controller.

According to various embodiments, the first virtual controller device may include a hardware button of a virtual reality controller. According to various embodiments, the second virtual controller device may include an accelerometer of the virtual reality controller.

According to various embodiments, the receiver 212 may further be configured to receive user input for assignment of the received input to the first virtual controller device or to the second virtual controller device.

According to various embodiments, the game controller may include a plurality of input elements, and each input element of the plurality of input element is assigned to the first virtual controller device or to the second virtual controller device.

According to various embodiments, the game controller may include a plurality of input elements, and a combination of input elements of the plurality of input element is assigned to the first virtual controller device or to the second virtual controller device According to various embodiments, the receiver 212 may be configured to receive the input from the game controller using a hardware interface to a computer.

According to various embodiments, the hardware interface may include or may be at least one of universal serial bus or Bluetooth.

According to various embodiments, the output circuit 216 may be configured to output data related to the first virtual controller device to a driver interface if it is determined that the received input is assigned to the first virtual controller device; and to output data related to the second virtual controller device to a driver interface if it is determined that the received input is assigned to the second virtual controller device.

According to various embodiments, the output circuit 216 may be configured to output data related to the first virtual controller device to a kernel of an operating system if it is determined that the received input is assigned to the first virtual controller device; and to output data related to the second virtual controller device to a kernel of an operating system if it is determined that the received input is assigned to the second virtual controller device.

According to various embodiments, the output circuit 216 may be configured to output data related to the first virtual controller device to a user space application if it is determined that the received input is assigned to the first virtual controller device; and to output data related to the second virtual controller device to a user space application if it is determined that the received input is assigned to the second virtual controller device.

According to various embodiments, a computer-readable medium may be provided. The computer-readable medium may include instructions which, when executed by a computer, make the computer perform a method for emulating a virtual controller device. The method may include: receiving input from a game controller; determining whether the received input is assigned to a first virtual controller device or to a second virtual controller device; outputting data related to the first virtual controller device if it is determined that the received input is assigned to the first virtual controller device; and outputting data related to the second virtual controller device if it is determined that the received input is assigned to the second virtual controller device.

According to various embodiments, the first virtual controller device and/or the second virtual controller device may include or may be or may be included in a controller of a type which is different from a type of the game controller.

According to various embodiments, the first virtual controller device may include a hardware button of a virtual reality controller. According to various embodiments, the second virtual controller device may include an accelerometer of the virtual reality controller According to various embodiments, the computer-readable medium may include instructions which, when executed by a computer, make the computer perform receiving user input for assignment of the received input to the first virtual controller device or to the second virtual controller device.

According to various embodiments, the game controller may include a plurality of input elements, and each input element of the plurality of input element may be assigned to the first virtual controller device or to the second virtual controller device.

According to various embodiments, the game controller may include a plurality of input elements, and a combination of input elements of the plurality of input element is assigned to the first virtual controller device or to the second virtual controller device.

According to various embodiments, the input may be received from the game controller using a hardware interface to a computer.

According to various embodiments, the hardware interface may include or may be at least one of universal serial bus or Bluetooth.

According to various embodiments, data related to the first virtual controller device may be output to a driver interface if it is determined that the received input is assigned to the first virtual controller device; and data related to the second virtual controller device may be output to a driver interface if it is determined that the received input is assigned to the second virtual controller device.

According to various embodiments, data related to the first virtual controller device may be output to a kernel of an operating system if it is determined that the received input is assigned to the first virtual controller device; and data related to the second virtual controller device may be output to a kernel of an operating system if it is determined that the received input is assigned to the second virtual controller device.

According to various embodiments, data related to the first virtual controller device may be output to a user space application if it is determined that the received input is assigned to the first virtual controller device; and data related to the second virtual controller device may be output to a user space application if it is determined that the received input is assigned to the second virtual controller device.

It will be understood that reference to a "virtual" controller is reference to a controller which may not be present physically, but which is emulated by the game controller according to various embodiments. A virtual controller may for example be a virtual VR controller or any other kind of controller, for example a controller of any type, for example any type of controller, and/or for example a controller of a type which is different from a type of the controller which is emulating the virtual controller. In other words, one type of controller may be transformed into another type of controller.

According to various embodiments, it may not be necessary to rewrite virtual reality applications.

According to various embodiments, a game controller for software applications may represent multiple virtual reality controllers. According to various embodiments, the HID (human interface device) descriptors and (HID) reports received by the operating system device driver may decide which report should be transformed into a report for one or more virtual reality controllers. Existing game applications may see an input (or may see events) corresponding to expected behavior and may operate accordingly.

Figure 3:
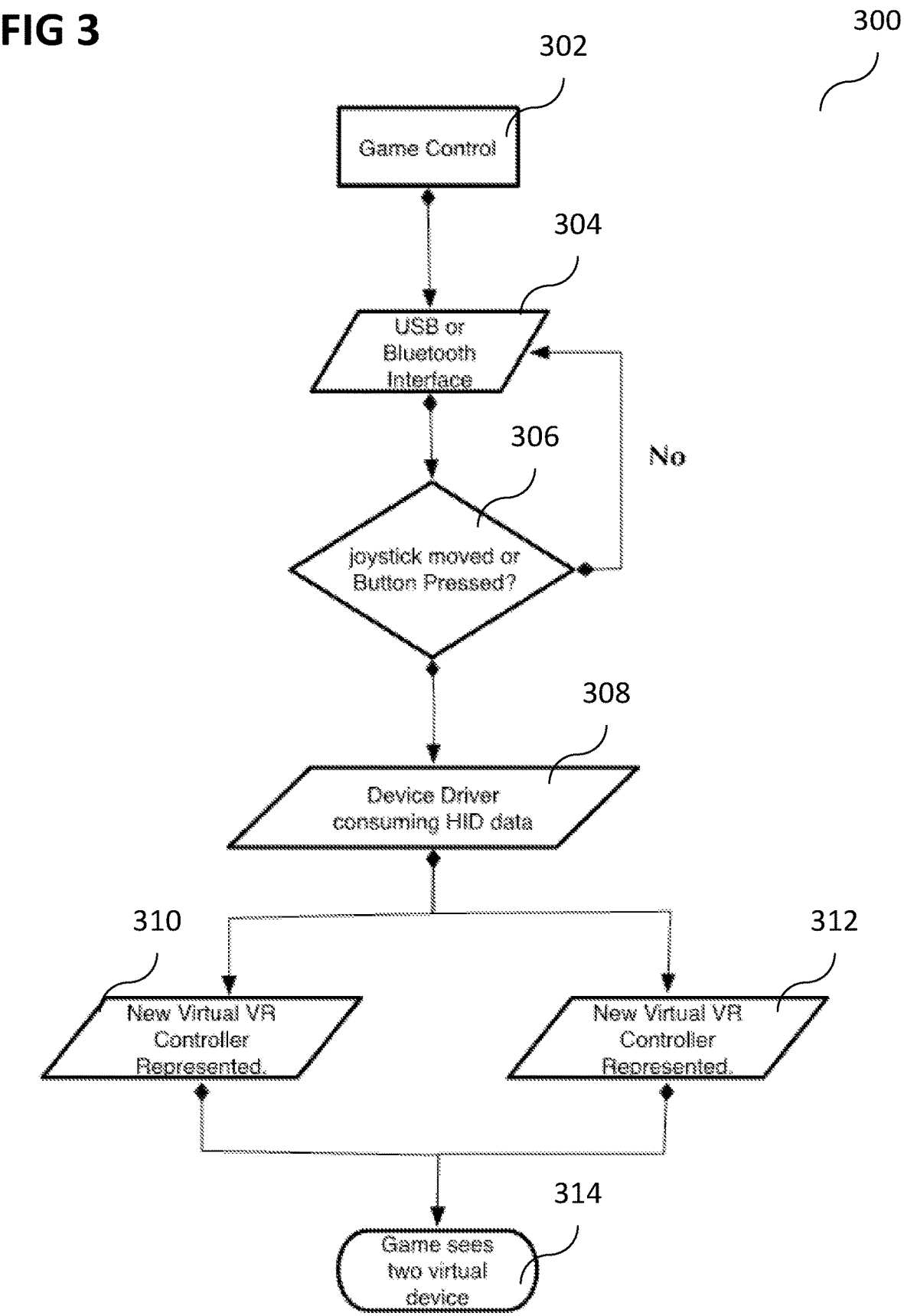
FIG. 3 shows a flow diagram illustrating game controller input being split for virtual reality controllers according to various embodiments.

FIG. 3 shows a flow diagram 300 illustrating game controller input being split for virtual reality controllers according to various embodiments. In 302, game control may start. In 304, an interface (for example a universal serial bus (USB) interface or a Bluetooth interface) may be provided. In 306, it may be determined whether a joystick is moved or a button is pressed. If it is determined in 306 that neither a joystick is moved nor a button is pressed, processing may proceed in 304. If it is determined in 306 that a joystick is moved or a button is pressed, a device driver consuming HID data may be provided in 308. In 310, a new (first) virtual reality (VR) controller may be represented. In 312, a new (second) virtual reality (VR) controller may be represented. Thus, a game may see two virtual devices, like indicated by 314, for example the first virtual reality controller and the second virtual reality controller.

According to various embodiments, an application running on an operation system (for example Windows, Linux, or Android) may see a standard game controller, and may then create a new virtual VR-controllers by separating (or transforming) the information and then informing the Operating System of that one or more virtual VR controller are available for use. This method (like illustrated also in FIG. 4) may work if an application can select which controller to use, so that the application may ignore the physical game controller, but may make use of the virtual VR controllers available. Windows, Linux, and Android each allow for virtual USB devices to be introduced in application space. Linux and Android may also allow HID inputs to be sent directly into the kernel, creating a virtual device.

Figure 4:
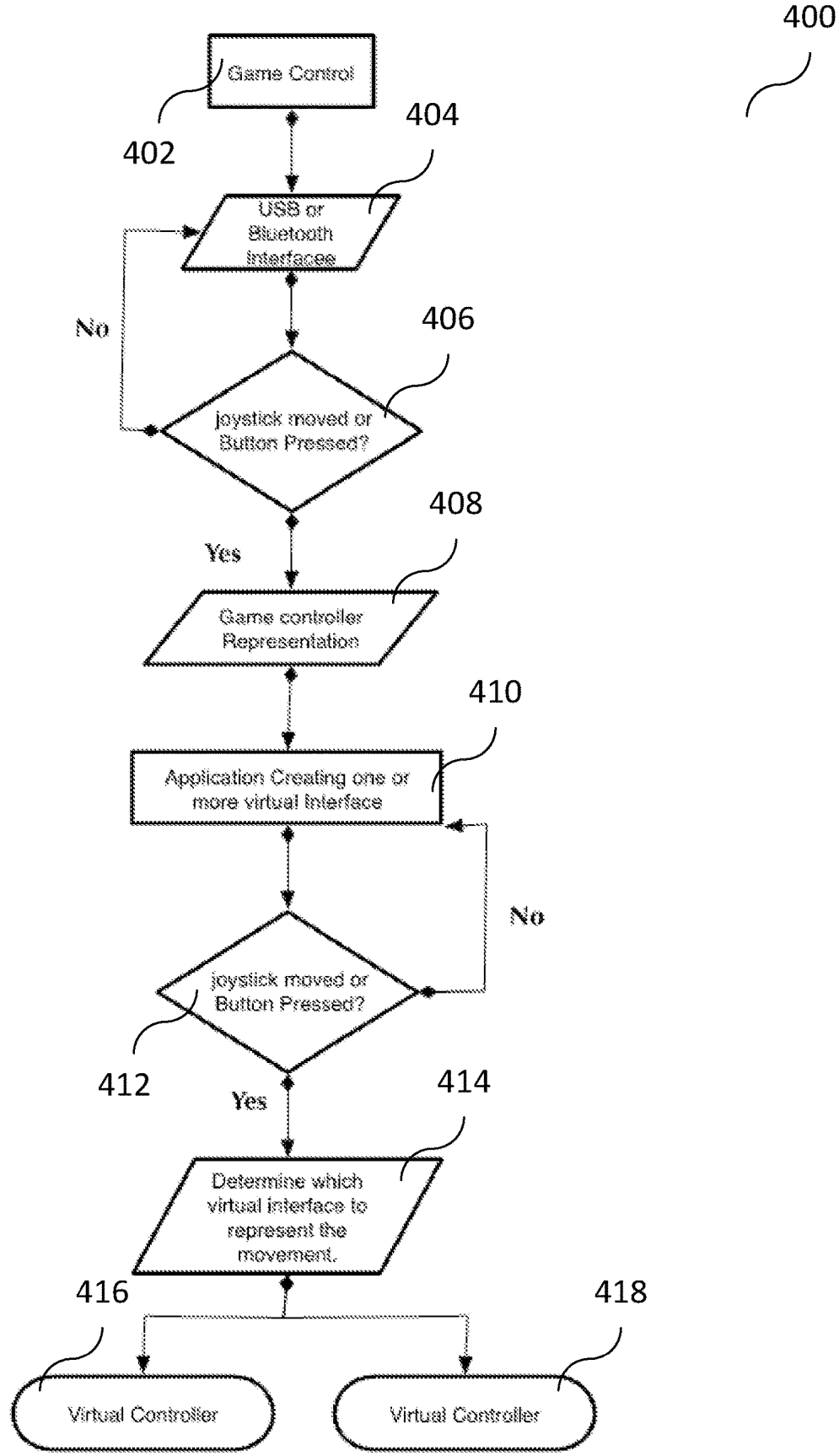
FIG. 4 shows a flow diagram illustrating a method according to various embodiments.

FIG. 4 shows a flow diagram 400 illustrating a method according to various embodiments. In 402, game control may be started. In 404, an interface (for example a universal serial bus (USB) interface or a Bluetooth interface) may be provided. In 406, it may be determined whether a joystick is moved or a button is pressed. If it is determined in 406 that neither a joystick is moved nor a button is pressed, processing may proceed in 404. If it is determined in 406 that a joystick is moved or a button is pressed, a game controller representation may be established in 408. In 410, an application may create one or more virtual interfaces. In 412, it may be determined whether a joystick is moved or a button is pressed. If it is determined in 412 that neither a joystick is moved nor a button is pressed, processing may proceed in 410. If it is determined in 412 that a joystick is moved or a button is pressed, it may be determined in 414 which virtual interface to represent the movement, and, depending on the determination, information about the movement may be sent to a first virtual controller in 416 or to a second virtual controller 418 (or to both the first virtual controller and the second virtual controller).

Some virtual reality controllers may contain accelerometers allowing the user's arm movement to be registered by the application. According to various embodiments, a standard controller (in other word: game controller) may represent a single virtual reality controller, and may take a first subset (for example half) of a standard controller to represent inputs, and a second subset (for example a second half) of the standard controller allowing the user to enter movements using buttons and axis controls. This is illustrated in FIG. 5.

Figure 5:
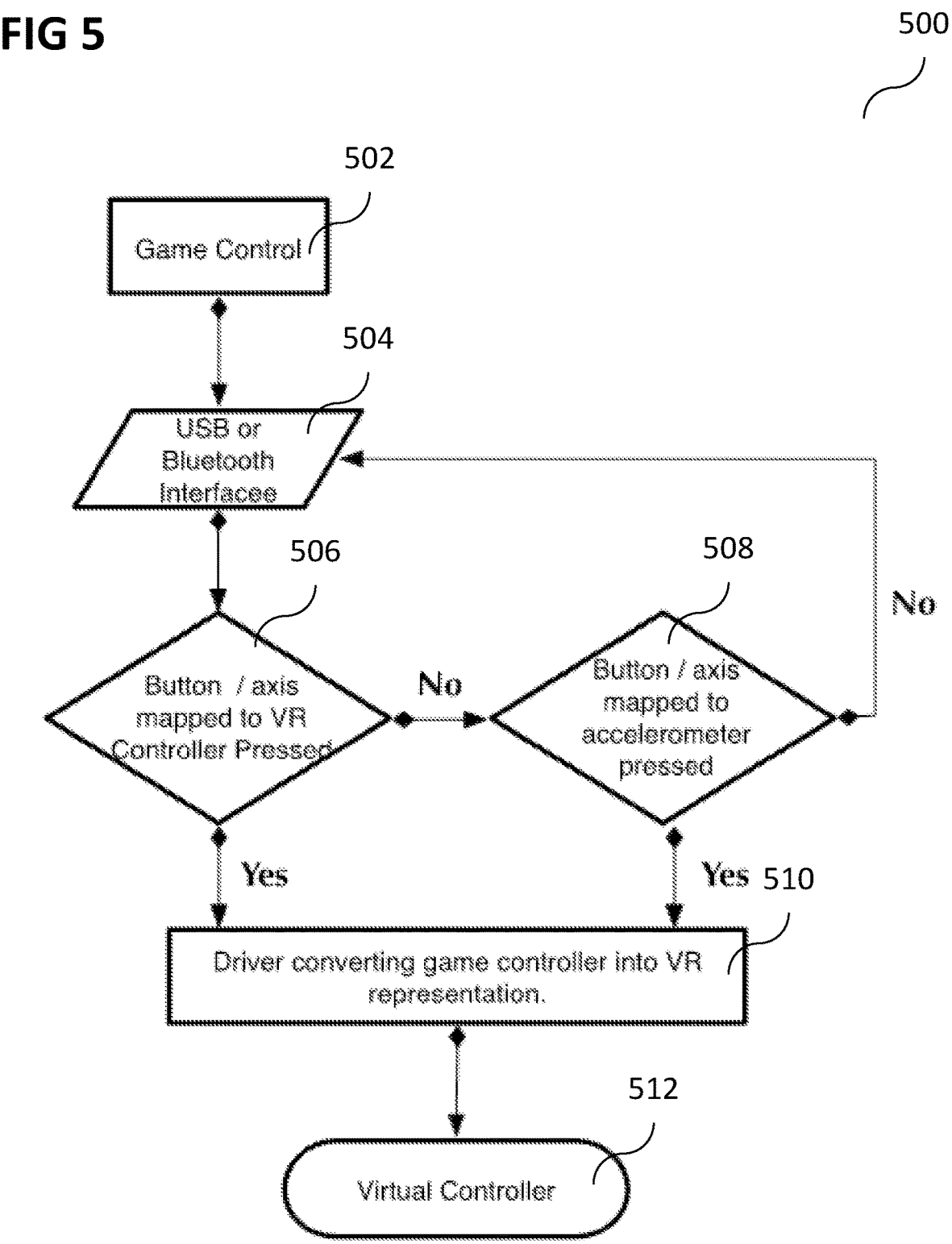
FIG. 5 shows a flow diagram illustrating a method according to various embodiments.

FIG. 5 shows a flow diagram 500 illustrating a method according to various embodiments. In 502, game control may be started. In 504, an interface (for example a universal serial bus (USB) interface or a Bluetooth interface) may be provided. In 506, it may be determined whether a button mapped to the VR controller is pressed or an axis mapped to the VR controller is actuated. If it is determined in 506 that neither a button mapped to the VR controller is pressed nor an axis mapped to the VR controller is actuated, processing may proceed in 508; otherwise, processing may proceed in 510. In 508, it may be determined whether a button mapped to the accelerometer is pressed or an axis mapped to the accelerometer is actuated. If it is determined in 508 that neither a button mapped to the accelerometer is pressed nor an axis mapped to the accelerometer is actuated, processing may proceed in 504; otherwise, processing may proceed in 510. In 510, the driver may convert game controller input into VR representation (i.e. either VR controller input or accelerometer input, depending on whether processing in 510 is incurred by processing in 506 or processing in 508). The VR representation may then be provided to a virtual controller 512.

Various embodiments may allow use of existing game controllers (which may be referred to as legacy controllers) in virtual reality applications. This may be useful, for example because existing games do not have to be modified to take advantage of any of these legacy controllers.

The following examples pertain to further embodiments.

Example 1 is a method for emulating a virtual controller device, the method comprising: receiving input from a game controller; determining whether the received input is assigned to a first virtual controller device or to a second virtual controller device; outputting data related to the first virtual controller device if it is determined that the received input is assigned to the first virtual controller device; and outputting data related to the second virtual controller device if it is determined that the received input is assigned to the second virtual controller device.

In example 2, the subject-matter of example 1 can optionally include that at least one of the first virtual controller device or the second virtual controller device comprises a controller of a type which is different from a type of the game controller.

In example 3, the subject-matter of any one of examples 1 to 2 can optionally include that the first virtual controller device comprises a hardware button of a virtual reality controller; and wherein the second virtual controller device comprises an accelerometer of the virtual reality controller.

In example 4, the subject-matter of any one of examples 1 to 3 can optionally include receiving user input for assignment of the received input to the first virtual controller device or to the second virtual controller device.

In example 5, the subject-matter of any one of examples 1 to 4 can optionally include that the game controller comprises a plurality of input elements; wherein each input element of the plurality of input element is assigned to the first virtual controller device or to the second virtual controller device.

In example 6, the subject-matter of any one of examples 1 to 5 can optionally include that the game controller comprises a plurality of input elements; wherein a combination of input elements of the plurality of input element is assigned to the first virtual controller device or to the second virtual controller device.

In example 7, the subject-matter of any one of examples 1 to 6 can optionally include that the input is received from the game controller using a hardware interface to a computer.

In example 8, the subject-matter of example 7 can optionally include that the hardware interface comprises at least one of universal serial bus or Bluetooth.

In example 9, the subject-matter of any one of examples 1 to 8 can optionally include that data related to the first virtual controller device is output to a driver interface if it is determined that the received input is assigned to the first virtual controller device; wherein data related to the second virtual controller device is output to a driver interface if it is determined that the received input is assigned to the second virtual controller device.

In example 10, the subject-matter of any one of examples 1 to 9 can optionally include that data related to the first virtual controller device is output to a kernel of an operating system if it is determined that the received input is assigned to the first virtual controller device; wherein data related to the second virtual controller device is output to a kernel of an operating system if it is determined that the received input is assigned to the second virtual controller device.

In example 11, the subject-matter of any one of examples 1 to 10 can optionally include that data related to the first virtual controller device is output to a user space application if it is determined that the received input is assigned to the first virtual controller device; wherein data related to the second virtual controller device is output to a user space application if it is determined that the received input is assigned to the second virtual controller device.

Example 12 is an emulator comprising: a receiver configured to receive input from a game controller; a determination circuit configured to determine whether the received input is assigned to a first virtual controller device or to a second virtual controller device; and an output circuit configured to output data related to the first virtual controller device if it is determined that the received input is assigned to the first virtual controller device, and configured to output data related to the second virtual controller device if it is determined that the received input is assigned to the second virtual controller device.

In example 13, the subject-matter of example 12 can optionally include that at least one of the first virtual controller device or the second virtual controller device comprises a controller of a type which is different from a type of the game controller.

In example 14, the subject-matter of any one of examples 12 to 13 can optionally include that the first virtual controller device comprises a hardware button of a virtual reality controller; wherein the second virtual controller device comprises an accelerometer of the virtual reality controller.

In example 15, the subject-matter of any one of examples 12 to 14 can optionally include that the receiver is further configured to receive user input for assignment of the received input to the first virtual controller device or to the second virtual controller device.

In example 16, the subject-matter of any one of examples 12 to 15 can optionally include that the game controller comprises a plurality of input elements; wherein each input element of the plurality of input element is assigned to the first virtual controller device or to the second virtual controller device.

In example 17, the subject-matter of any one of examples 12 to 16 can optionally include that the game controller comprises a plurality of input elements; wherein a combination of input elements of the plurality of input element is assigned to the first virtual controller device or to the second virtual controller device.

In example 18, the subject-matter of any one of examples 12 to 17 can optionally include that the receiver is configured to receive the input from the game controller using a hardware interface to a computer.

In example 19, the subject-matter of example 18 can optionally include that the hardware interface comprises at least one of universal serial bus or Bluetooth.

In example 20, the subject-matter of any one of examples 12 to 19 can optionally include that the output circuit is configured to output data related to the first virtual controller device to a driver interface if it is determined that the received input is assigned to the first virtual controller device; and to output data related to the second virtual controller device to a driver interface if it is determined that the received input is assigned to the second virtual controller device.

In example 21, the subject-matter of any one of examples 12 to 20 can optionally include that the output circuit is configured to output data related to the first virtual controller device to a kernel of an operating system if it is determined that the received input is assigned to the first virtual controller device; and to output data related to the second virtual controller device to a kernel of an operating system if it is determined that the received input is assigned to the second virtual controller device.

In example 22, the subject-matter of any one of examples 12 to 21 can optionally include that the output circuit is configured to output data related to the first virtual controller device to a user space application if it is determined that the received input is assigned to the first virtual controller device; and to output data related to the second virtual controller device to a user space application if it is determined that the received input is assigned to the second virtual controller device.

Example 23 is a computer-readable medium comprising instructions which, when executed by a computer, make the computer perform a method for emulating a virtual controller device, the method comprising: receiving input from a game controller; determining whether the received input is assigned to a first virtual controller device or to a second virtual controller device; outputting data related to the first virtual controller device if it is determined that the received input is assigned to the first virtual controller device; and outputting data related to the second virtual controller device if it is determined that the received input is assigned to the second virtual controller device.

In example 24, the subject-matter of examples 23 can optionally include that at least one of the first virtual controller device or the second virtual controller device comprises a controller of a type which is different from a type of the game controller.

In example 25, the subject-matter of any one of examples 23 to 24 can optionally include that the first virtual controller device comprises a hardware button of a virtual reality controller; wherein the second virtual controller device comprises an accelerometer of the virtual reality controller.

In example 26, the subject-matter of any one of examples 23 to 25 can optionally include instructions which, when executed by a computer, make the computer perform: receiving user input for assignment of the received input to the first virtual controller device or to the second virtual controller device.

In example 27, the subject-matter of any one of examples 23 to 26 can optionally include that the game controller comprises a plurality of input elements; wherein each input element of the plurality of input element is assigned to the first virtual controller device or to the second virtual controller device.

In example 28, the subject-matter of any one of examples 23 to 27 can optionally include that the game controller comprises a plurality of input elements; wherein a combination of input elements of the plurality of input element is assigned to the first virtual controller device or to the second virtual controller device.

In example 29, the subject-matter of any one of examples 23 to 28 can optionally include that the input is received from the game controller using a hardware interface to a computer.

In example 30, the subject-matter of example 29 can optionally include that the hardware interface comprises at least one of universal serial bus or Bluetooth.

In example 31, the subject-matter of any one of examples 23 to 30 can optionally include that data related to the first virtual controller device is output to a driver interface if it is determined that the received input is assigned to the first virtual controller device; wherein data related to the second virtual controller device is output to a driver interface if it is determined that the received input is assigned to the second virtual controller device.

In example 32, the subject-matter of any one of examples 23 to 31 can optionally include that data related to the first virtual controller device is output to a kernel of an operating system if it is determined that the received input is assigned to the first virtual controller device; wherein data related to the second virtual controller device is output to a kernel of an operating system if it is determined that the received input is assigned to the second virtual controller device.

In example 33, the subject-matter of any one of examples 23 to 32 can optionally include that data related to the first virtual controller device is output to a user space application if it is determined that the received input is assigned to the first virtual controller device; wherein data related to the second virtual controller device is output to a user space application if it is determined that the received input is assigned to the second virtual controller device.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for emulating a virtual controller device, the method comprising:
    receiving input from a game controller, wherein the game controller is a physical device and comprises a plurality of input elements;
    determining whether the received input is assigned to a first virtual controller device or to a second virtual controller device, wherein the first virtual controller and second virtual controller devices are not physical devices and each input element of the plurality of input elements is assigned to the first virtual controller device or to the second virtual controller device;
    emulating the received input from the game controller to represent an input from the first virtual controller device if it is determined that the received input is assigned to the first virtual controller device; and
    emulating the received input from the game controller to represent an input from the second virtual controller device if it is determined that the received input is assigned to the second virtual controller device.

2. The method of claim 1, further comprising the first virtual controller and second virtual controller devices controlling a virtual reality application,
    wherein at least one of the first virtual controller device or the second virtual controller device comprises a controller of a type which is different from a type of the game controller.

3. The method of claim 1,
    wherein the first virtual controller device comprises a hardware button of a virtual reality controller; and
    wherein the second virtual controller device comprises an accelerometer of the virtual reality controller.

4. The method of claim 1, further comprising:
    receiving user input for assignment of the received input to the first virtual controller device or to the second virtual controller device.

5. The method of claim 1,
    wherein a combination of input elements of the plurality of input element is assigned to the first virtual controller device or to the second virtual controller device.

6. The method of claim 1,
    wherein the received input from the game controller using a hardware interface to a computer, wherein the hardware interface comprises at least one of universal serial bus or Bluetooth.

7. The method of claim 1,
    wherein data related to the first virtual controller device is output to a driver interface if it is determined that the received input is assigned to the first virtual controller device; and
    wherein data related to the second virtual controller device is output to a driver interface if it is determined that the received input is assigned to the second virtual controller device.

8. The method of claim 1,
    wherein data related to the first virtual controller device is output to a kernel of an operating system if it is determined that the received input is assigned to the first virtual controller device; and
    wherein data related to the second virtual controller device is output to a kernel of an operating system if it is determined that the received input is assigned to the second virtual controller device.

9. The method of claim 1,
wherein data related to the first virtual controller device is output to a user space application if it is determined that the received input is assigned to the first virtual controller device; and
wherein data related to the second virtual controller device is output to a user space application if it is determined that the received input is assigned to the second virtual controller device.

10. An emulator comprising:
a receiver configured to receive input from a game controller, wherein the game controller is a physical device and comprises a plurality of input elements;
a determination circuit configured to determine whether the received input is assigned to a first virtual controller device or to a second virtual controller device, wherein the first virtual controller and second virtual controller devices are not physical devices and each input element of the plurality of input elements is assigned to the first virtual controller device or to the second virtual controller device; and
an output circuit configured to emulate the received input from the game controller to represent an input from the first virtual controller device if it is determined that the received input is assigned to the first virtual controller device, and configured to emulate the received input from the game controller to represent an input from the second virtual controller device if it is determined that the received input is assigned to the second virtual controller device.

11. The emulator of claim 10, wherein the first virtual controller and second virtual controller devices are controlling a virtual reality application,
wherein at least one of the first virtual controller device or the second virtual controller device comprises a controller of a type which is different from a type of the game controller.

12. The emulator of claim 10,
wherein the first virtual controller device comprises a hardware button of a virtual reality controller; and
wherein the second virtual controller device comprises an accelerometer of the virtual reality controller.

13. The emulator of claim 10,
wherein the receiver is further configured to receive user input for assignment of the received input to the first virtual controller device or to the second virtual controller device.

14. The emulator of claim 10,
wherein a combination of input elements of the plurality of input element is assigned to the first virtual controller device or to the second virtual controller device.

15. The emulator of claim 10,
wherein the output circuit is configured to output data related to the first virtual controller device to a driver interface if it is determined that the received input is assigned to the first virtual controller device; and to output data related to the second virtual controller device to a driver interface if it is determined that the received input is assigned to the second virtual controller device.

16. The emulator of claim 10,
wherein the output circuit is configured to output data related to the first virtual controller device to a kernel of an operating system if it is determined that the received input is assigned to the first virtual controller device; and to output data related to the second virtual controller device to a kernel of an operating system if it is determined that the received input is assigned to the second virtual controller device.

17. The emulator of claim 10,
wherein the output circuit is configured to output data related to the first virtual controller device to a user space application if it is determined that the received input is assigned to the first virtual controller device; and to output data related to the second virtual controller device to a user space application if it is determined that the received input is assigned to the second virtual controller device.

18. A non-transitory computer-readable medium comprising instructions which, when executed by a computer, make the computer perform a method for emulating a virtual controller device, the method comprising:
receiving input from a game controller, wherein the game controller is a physical device and comprises a plurality of input elements;
determining whether the received input is assigned to a first virtual controller device or to a second virtual controller device, wherein the first virtual controller and second virtual controller devices are not physical devices and each input element of the plurality of input elements is assigned to the first virtual controller device or to the second virtual controller device;
emulating the received input from the game controller to represent an input from the first virtual controller device if it is determined that the received input is assigned to the first virtual controller device; and
emulating the received input from the game controller to represent an input from the second virtual controller device if it is determined that the received input is assigned to the second virtual controller device.

* * * * *